UNITED STATES PATENT OFFICE.

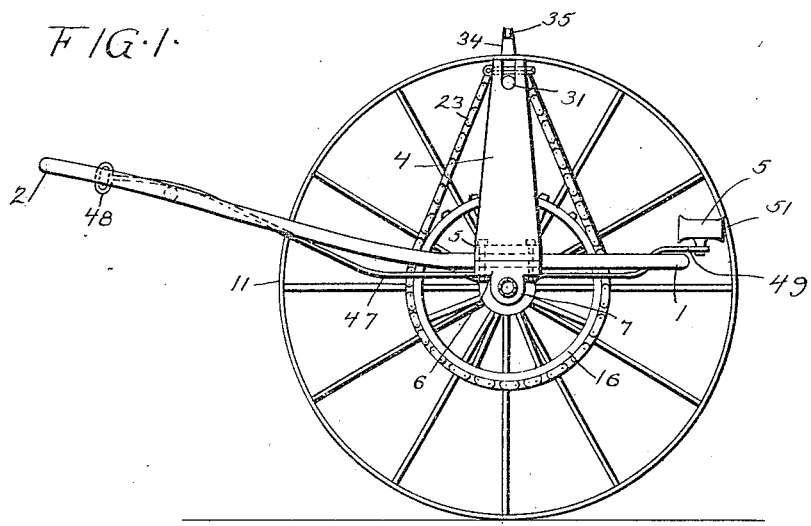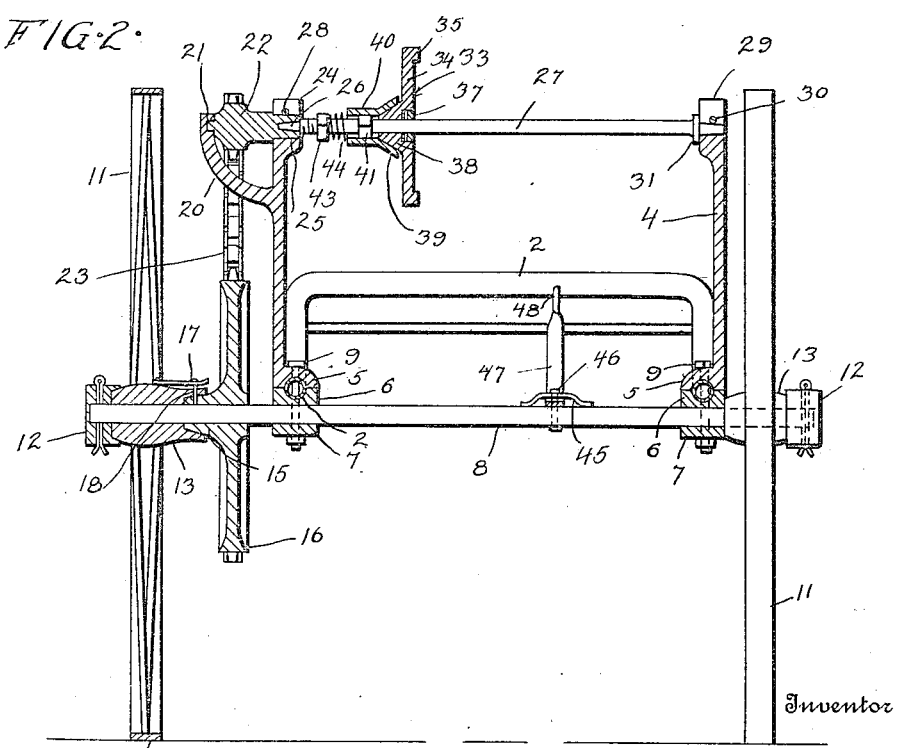

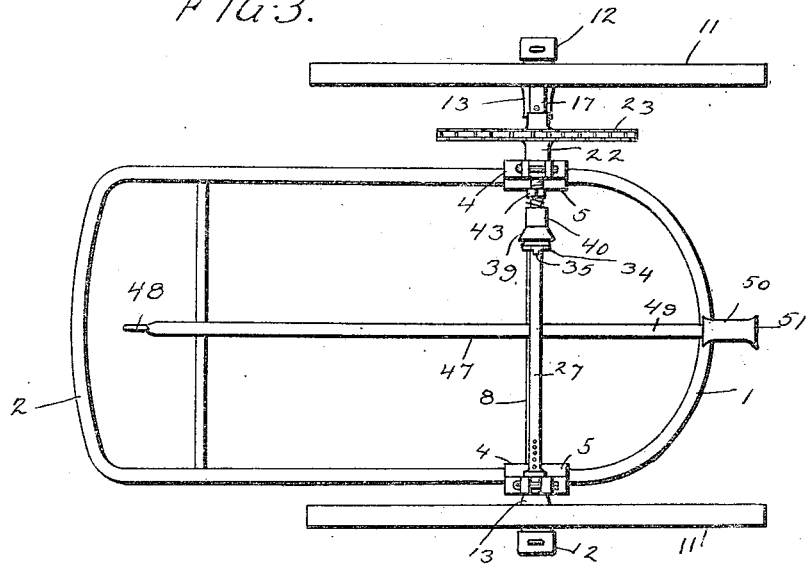

MARTIN N. SCHUMANN, OF NEW LISBON, WISCONSIN.

WIRE-WINDER.

1,276,973.     Specification of Letters Patent.     Patented Aug. 27, 1918.

Application filed September 23, 1916. Serial No. 121,746.

*To all whom it may concern:*

Be it known that I, MARTIN N. SCHUMANN, a citizen of the United States, residing at New Lisbon, in the county of Juneau and State of Wisconsin, have invented certain new and useful Improvements in Wire-Winders; and I do hereby declare the following to be a full, clear, and exact description of the invention, such as will enable others skilled in the art to which it appertains to make and use the same.

This invention relates to a wire winder and has for its primary object the provision of a device for supporting a wire reel, whereby wire may be wound and unwound therefrom when desired, obviating the danger of cutting or injuring the hands of a person when handling bob wire or the like.

Another object of this invention is to provide a frame having ground wheels thereon and a reel axle on which wire may be wound or unwound therefrom by pulling or pushing the device.

A further object of this invention is the provision of means for rotatably connecting and disconnecting the reel axle to one of the ground wheels, whereby the reel axle will be rotated to wind the wire thereon when the device is pushed over the ground and whereby the reel axle may be freed from the ground wheels to unwind the wire therefrom when desired.

A further object of this invention is to provide means upon the reel axle for locking a reel against rotation thereon, to cause the same to rotate with the reel axle when driven by the ground wheels to wind wire thereon.

A further object of this invention is the provision of means upon the frame for receiving the wire prior to being wound on the reel, whereby the wire may be evenly guided thereon.

A still further object of this invention is the provision of a wire winder of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a side elevation of a wire winder, constructed in accordance with my invention, Fig. 2 is a vertical sectional view of the same, Fig. 3 is a top plan view of the device illustrating the means of guiding the wire from the wire reel or reel axle, Fig. 4 is a perspective view of the reel axle, Fig. 5 is a perspective view of the reel, Fig. 6 is a fragmentary sectional view of the means for guiding the wire upon the reel, and Fig. 7 is a detail perspective view of one of the clutch elements upon the reel axle.

Referring in detail to the drawings, the numeral 1 indicates a substantially U-shaped frame having its arm portions connected together by a handle 2. Vertical standards 3 and 4 have formed upon their lower ends bearing sections 5 which coöperate with bearing sections 6 for clamping the vertical standards 3 and 4 to the U-shaped frame 1 adjacent the web portion thereof. The bearing sections 6 have enlarged portions 7 which are transversely apertured for the reception of an axle 8. Suitable bolts 9 extend through the bearing sections 5 and 6 and through the frame an axle 8, whereby the frame and axle are rigidly secured together as well as the standards 3 and 4 secured to the frame. Ground wheels 10 and 11 are journaled on the ends of the axle 8 and are held thereon by caps 12 which have cotter pins extending therethrough and which extend through the end of the axle 8 to efficiently hold the wheels 10 and 11 upon the axle and providing means whereby the wheels may be removed when desired. The hub 13 of the ground wheel 10 has a conical-shaped recess 14 for the reception of a conical-shaped portion 15 formed upon a gear or sprocket wheel 16 which is journaled upon the axle 8. A spring clip 17 is pivoted to the hub 13 and has secured thereto a pin 18 which extends through the hub 13 and the conical-shaped portion 15 of the sprocket wheel 16 for establishing a connection between the sprocket wheel and the ground wheel 10 so as to rotate the sprocket wheel upon rotation of the ground wheel.

The vertical standard 3 has formed adjacent its upper end an arm 20 which is recessed to receive a bearing 21 formed upon a sprocket wheel 22 which is connected with the sprocket wheel 16 by an endless chain 23 for rotating same upon rotation of the sprocket wheel 16. The upper end of the vertical standard 3 is bifurcated as illustrated at 24 for rotatably receiving the reduced portion 25 of the hub of the sprocket wheel 22 and has a squared recess therein for receiving a squared reduced end 26 of a reel axle 27. The reduced portion 25 of the hub of the sprocket wheel 22 is held within the bifurcated ends 24 of the vertical standard 3 by means of a cotter pin 28. The vertical standard 4 has its upper end bifurcated as illustrated at 29 for the reception of the other end of the reel axle 27 and which is secured therein by a cotter pin 30 and has secured thereon a collar 31 which abuts the standard 4.

The usual wire reel 32 is positioned upon the reel axle 27 having one end thereof abutting the collar 31 and its opposite end engaged by a clutch element 33 consisting of the arm portions 34 which have their ends bent to form reel engaging hooks 35 that engage the cross arm 36 of the reel 32. A bearing 37 is keyed to the axle reel 27 on which the clutch element 33 rotates. The hub portion 38 of the clutch element 33 is of conical formation and is received by the conical portion 39 of a clutch element 40. The clutch element 40 has a squared bore to coöperate with a squared collar 41 secured to the reel shaft 27. The reel shaft 27 is screw threaded as illustrated at 42 for receiving an adjusting nut 43. A coil spring 44 is interposed between the adjusting nut 43 and a clutch element 40 for urging the clutch element 40 into an engagement with the clutch element 33 to establish a connection between the reel axle 27 and the clutch element 33 for rotating the wire reel 32 thereon, thus it will be seen as the device is pushed along upon the ground wheels 10 and 11, the ground wheel 10 will rotate the reel shaft 27 by the sprocket wheels 16 and 22, causing wire to wind upon the reel 32. When desiring to unwind the wire from the reel 32, the pin 18 upon the spring clip 17 is disengaged from the conical-shaped portion 15 of the sprocket wheel 16 thereby freeing the reel shaft 27 from the ground wheel 10. As the device is pulled along, the wire will unwind from the reel 32 owing to the fact that the wire is usually attached to a permanent object causing the wire to unwind from the reel as the device is moved away from the permanent object.

A clip 45 is secured to the axle 8 and has a pin or bolt 46 which extends through the axle for pivotally securing a longitudinally extending rod 47 to the clip 45. The rod 47 extends rearwardly in the direction of the handle 2 and is bent to form a hand grip 48 located adjacent the handle 2 and in convenient reach of the operator. The other end of the rod 47 is offset as illustrated at 49 to dispose same in a plane above the frame 1. A cylindrical-shaped guide member 50 is secured to the offset portion 49 of the rod 47 and has each end squared as illustrated at 51, so that a wire may be passed through the cylindrical guide member 50 prior to being wound upon the reel 32. As the device is pushed along to wind the wire upon the reel, the operator may control the winding action of the wire upon the reel by shifting the location of the guide member 50 so as to evenly guide the wire upon the reel.

While I have shown and described the preferred embodiment of my invention, it will be understood that minor changes in construction, combination and arrangement of parts may be made without departing from the spirit and scope of the invention as claimed.

Having thus described my invention, what I claim is:—

A wire winder comprising a frame, uprights secured to said frame, a reel shaft journaled to said uprights, a wire reel journaled on said shaft, a conical hub journaled on said shaft, oppositely disposed arms formed on said hub and having hooked ends for engagement with the wire reel, a collar secured to the shaft and having squared faces, a clutch element having a squared bore to receive the squared faces of the collar to secure the clutch elements to the shaft for rotation therewith and which will permit sliding movement thereof in relation to the shaft, a conical portion formed on said clutch element and adapted to receive the conical hub, a nut threaded to said shaft and capable of adjustment thereon, a spring interposed between the nut and clutch element for urging the conical portion thereof in engagement with the conical hub to lock the reel to said shaft, and means rotating said shaft.

In testimony whereof I affix my signature in presence of two witnesses.

MARTIN N. SCHUMANN.

Witnesses:
WALTER GERBERICH,
AUGUSTA KRAMER.

Copies of this patent may be obtained for five cents each, by addressing the "Commissioner of Patents, Washington, D. C."